United States Patent [19]

Huber et al.

[11] 4,114,175
[45] Sep. 12, 1978

[54] SHUTTER MECHANISM

[75] Inventors: Leonhard Huber, Glonn; Helmut Kirschner, Munich; Herbert Muller, Assling, all of Germany

[73] Assignee: Agfa-Gevaert AG, Leverkusen, Germany

[21] Appl. No.: 763,684

[22] Filed: Jan. 28, 1977

[30] Foreign Application Priority Data

Jan. 30, 1976 [DE] Fed. Rep. of Germany ....... 2603657

[51] Int. Cl.² .............................................. G03B 9/08
[52] U.S. Cl. .................................................. 354/252
[58] Field of Search ................ 354/250, 252, 259, 260

[56] References Cited

U.S. PATENT DOCUMENTS

| 3,575,097 | 4/1971 | Gonzalez | 354/252 X |
| 3,810,225 | 5/1974 | Nakamura | 354/252 |
| 3,982,256 | 9/1976 | Ohmori et al. | 354/260 X |

*Primary Examiner*—Donald A. Griffin
*Attorney, Agent, or Firm*—Michael J. Striker

[57] ABSTRACT

The shutter mechanism includes an aperture-unblocking member mounted for movement between an unactivated aperture-blocking position and an activated aperture-unblocking position. A cocked drive mechanism is coupled to the aperture-unblocking member and is operative when released for moving the member from the unactivated to the activated position. An inertial braking mechanism is driven by the drive mechanism when the latter moves the aperture-unblocking member to the activated position, and is operative during such movement for applying to the drive mechanism an inertial braking force slowing the movement of the aperture-unblocking member to the activated position. The drive mechanism includes a drive cam, and the inertial braking mechanism includes a driven cam. The surface of the drive cam bears upon the surface of the driven cam and transmits to the driven cam the drive force by means of which the drive mechanism drives the inertial braking mechanism. The cams are so configured that, as the drive mechanism drives the inertial braking mechanism, the surface of the drive cam rolls along the surface of the driven cam.

10 Claims, 3 Drawing Figures

SHUTTER MECHANISM

BACKGROUND OF THE INVENTION

The invention relates to shutter mechanisms of the type including an aperture-unblocking member mounted for movement between an unactivated aperture-blocking position and an activated aperture-unblocking position, and a drive mechanism coupled to the aperture-unblocking member. The type of shutter mechanism in question furthermore includes a braking mechanism driven by the drive mechanism when the aperture-unblocking member moves from the aperture-blocking position to the aperture-unblocking position. During such movement of the aperture-unblocking member, the braking mechanism driven by the drive mechanism applies to the latter braking force slowing the movement of the aperture-unblocking member to its aperture-unblocking position. The drive mechanism which drives the braking mechanism during movement of the aperture-unblocking member from its blocking to its unblocking position may either be a mechanism for actually driving such member to its unblocking position, or alternatively may be driven by the aperture-unblocking member during the movement of the latter, or may be driven by the drive mechanism for the aperture-unblocking member. Often, such shutter mechanism additionally include a distinct aperture-blocking member movable from an aperture-unblocking position to an aperture-blocking position, for terminating an exposure operation.

With shutter mechanisms employing such braking mechanisms to slow the movement of the aperture-unblocking member from the blocking to the unblocking position, problems are often encountered. In the first place, to slow the movement of the aperture-unblocking member in a proper manner, it would in principle be desirable to have the braking mechanism apply to the drive mechanism a braking force which is initially relatively low, so that high acceleration of the aperture-unblocking member at the start of its movement would not be prevented. On the other hand, once the speed of movement of the accelerating aperture-unblocking member has reached the design value, the braking action should become quite decisive in character. We have found that the prior art does not provide braking mechanisms capable of simply and reliably enough achieving this desirable manner of operation. Also, braking mechanisms of the prior art are very often characterized by high frictional wear which as it progresses may produce a progressive alteration in the braking action actually afforded, i.e., a progressive departure from the braking action contemplated by the designer.

SUMMARY OF THE INVENTION

It is a general object of the invention to provide a shutter mechanism of the type in question in which the braking mechanism is of a particularly simple and reliable construction, is of such a design as to inherently minimize frictional wear of engaged moving parts such as might otherwise alter the actual braking effect, and of such a construction that the slowing of the movement of the aperture-unblocking member is initially reduced so that movement of such member out of its unactivated position will be initiated with high acceleration.

These objects, and others which will become more understandable from the description of preferred embodiments, below, can be met, according to one advantageous concept of the invention by construction the drive mechanism which moves the aperture-unblocking member and drives an inertial braking mechanism during such movement to include a drive cam, and by constructing the inertial braking mechanism to include a driven cam driven by the drive cam. In particular, the surface of the drive cam bears upon the surface of the driven cam and transmits to the driven cam the drive force by means of which the drive mechanism drives the inertial braking mechanism. The drive cam and the driven cam are so configured that, as the aperture-unblocking member moves from the blocking position to the unblocking position, the surface of the drive cam actually rolls along the surface of the driven cam.

Because the surface of the drive cam of the drive mechanism rolls along the surface of the driven cam of the inertial braking mechanism, there is achieved a virtually non-frictional transmission to the driven cam of the drive force by means of which the drive mechanism drives the inertial braking mechanism, and conversely a virtually non-frictional transmission from the driven cam to the drive cam of the inertial braking force by means of which the movement of the aperture-unblocking member is slowed. Thus, progressive frictional wear, whose progressive effect upon the actual inertial braking action is very difficult for the designer accurately to take into account, is simply eliminated.

By suitably configuring the drive cam and the driven cam, in a way discussed below, it is possible to establish between the driven mechanism and the inertial braking mechanism a force transmission ratio which varies progressively during progressive movement of the unblocking member from the blocking to the unblocking position.

According to another concept of the invention, the drive mechanism is provided with first biasing means which transmits driving force to the drive cam of the drive mechanism, and the inertial braking mechanism is provided with second biasing means for resisting the drive force transmitted to the driven cam by the drive cam.

According to a further concept of the invention, the drive cam and the driven cam are each mounted for rotation about respective first and second axes. The configurations of the two cams are such that the location of contact of the surfaces of the two cam progressively moves from a position near the first axis towards the second axis as the aperture-unblocking member moves from the blocking to the unblocking position. This has the advantageous result that the inertial braking action afforded by the heavy inertial braking mass of the braking mechanism is low during the initial part of the range of movement of the aperture-unblocking member and of the cooperating drive mechanism, but increases as the aperture-unblocking member moves towards the unblocking position; this progressive increase in the transmission ratio between the drive mechanism and the inertial braking mechanism ensures high initial acceleration of the aperture-unblocking member out of its blocking position, so that the inertial resistance of the unblocking member at the start of its unblocking movement is quickly and decisively overcome, and so that the unblocking member quickly reaches its designed speed of unblocking movement. However, as the aperture-unblocking member and accordingly the drive mechanism move further, the surface of the drive cam rolls along the surface of the driven cam towards the rotation axis of the driven cam, resulting in a corresponding displacement of the location of contact of the two cam surfaces towards the axis of the driven cam. As a result, as the aperture-unblocking member moves closer to the unblocking position, the inertial braking mechanism applies a greater inertial braking force. Preferably, at the start of the range of movement of the aperture-unblocking member and of the drive mechanism, the inertial braking action is very low.

According to a more specific conception of the feature in question, the configuration of the drive and driven cams is such that the amount of travel of the location of contact of the two cam surfaces from the rotation axis of the drive cam to that of the driven cam, per degree of rotation of the drive cam, increases with movement of the unblocking member towards its unblocking position, at least in that part of the range of movement of the cams corresponding to the initial part of the range of movement of the unblocking member from its blocking to its unblocking position. This relationship has been found to be of particular advantage when establishing the aforementioned progressive variation of the transmission ratio between the drive mechanism and the inertial braking mechanism. This relationship has been found to be of particular advantage when the aforementioned progressive braking action is to be established, i.e., when the inertial braking action is to be substantially constant and of low magnitude for the initial part of the range of movement of the aperture-unblocking mechanism and the cooperating drive mechanism, but of greater strength in the following part of such range of movement. By suitably configuring the two cams, it is possible to achieve an almost perfectly linear unblocking motion of the aperture-unblocking member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
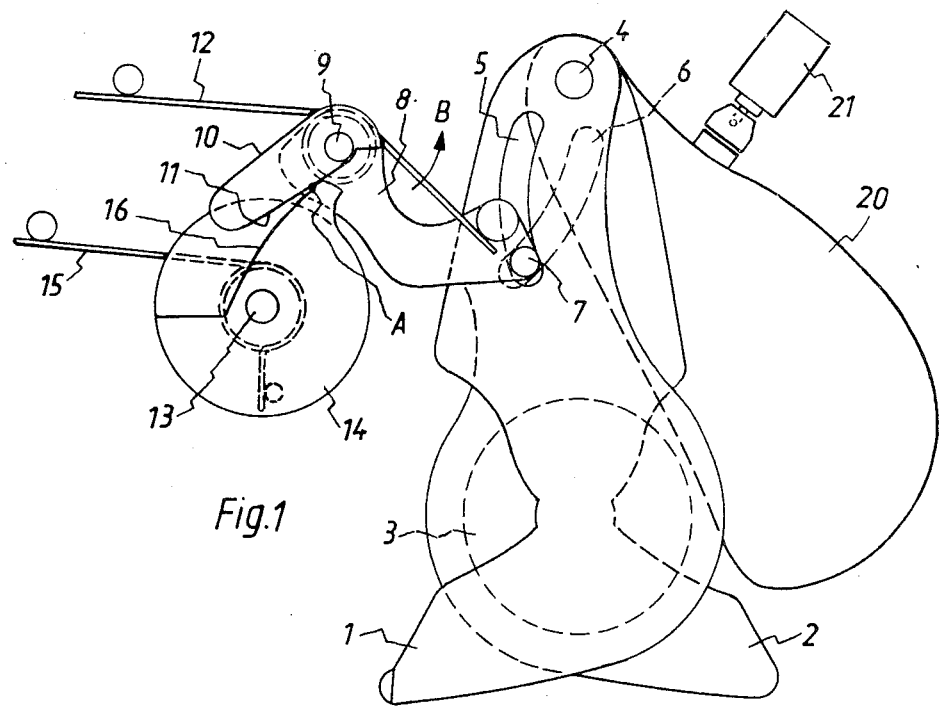
FIG. 1 depicts a first embodiment of a shutter mechanism designed according to the principles of the present invention, with the aperture-unblocking members of the shutter mechanism in their unactivated blocking positions, and with the aperture-blocking member of the shutter mechanism in its unactivated unblocking position.
Figure 2:
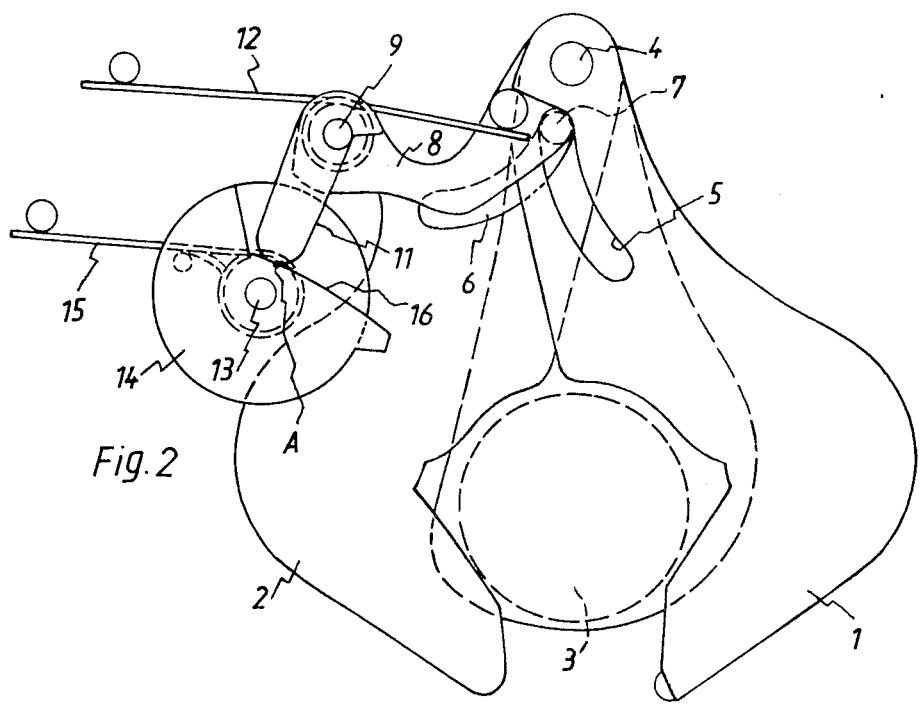
FIG. 2 depicts the embodiment of FIG. 1, with the aperture-unblocking members in their activated unblocking positions, and with the aperture-blocking member in its activated blocking position.

In FIGS. 1 and 2, numeral 3 denotes the objective aperture of a photographic camera, and numerals 1 and 2 denote first and second aperture-unblocking members. Aperture-unblocking members 1 and 2 are mounted on a common pivot 4 for pivotal motion between aperture-blocking positions (FIG. 1) and aperture-unblocking positions (FIG. 2). The unblocking members 1 and 2 are provided with respective guide slots 5 and 6. Passing through both guide slots 5, 6 is a rocking pin 7 fixedly mounted on one of the ends of a two-armed drive lever 8. Drive lever 8 is mounted for rotation on a fixed pivot 9. Drive lever 8 is provided with a first torsion spring 12, one arm of which bears against a fixed projection on the right arm of lever 8, the other arm of which bears upon a stationary abutment in the housing of the (non-illustrated) camera. First torsion spring 12 biases drive lever 8 for counterclockwise rotation, as indicated by arrow B. The left arm 10 of drive lever 8 constitutes a drive cam having a cam surface 11. Components 7–12 together constitute a drive mechanism for the aperture-unblocking members 1 and 2. Resettable cocking means (not illustrated in the drawing) normally hold the drive lever 8 in the position shown in FIG. 1. When the cocked drive lever 8 is released, first torsion spring 12 causes the drive lever 8 to pivot counterclockwise, as indicated by arrow B. As a result, rocking pin 7 slides upward along the two guide slots 5, 6 of the unblocking members 1, 2, displacing the latter from their blocking positions (FIG. 1) to their unblocking positions (FIG. 2). Details of the resettable cocking mechanism for the drive lever 8 are not shown, because they do not per se form part of the invention, and are entirely conventional in the art; a similar shutter mechanism action is described, for example, in U.S. Pat. No. 3,602,122, the disclosure of which is incorporated herein by reference.

The shutter mechanism of FIGS. 1 and 2 furthermore includes an inertial braking mechanism 13–16. The inertial braking mechanism includes a heavy inertia wheel 14 mounted for rotation about a stationary pivot 13. Inertia wheel 14 is provided with a second torsion spring 15, one end of which bears against a projection on the inertial wheel, the other end of which bears against a stationary abutment in the housing of the camera. Torsion spring 15 biases the inertia wheel 14 counterclockwise.

The inertia wheel 14 of the inertial braking mechanism 13–16 is provided with an integral driven cam having a cam surface 16. The surface 11 of the drive cam 10 of the drive mechanism 8–12 bears against the surface 16 of the driven cam of the inertial braking mechanism 13–16.

When the cocked drive lever 8 of the drive mechanism is released, to move the unblocking members from the blocking to the unblocking positions, the drive mechanism 7–12 drives the inertial braking mechanism 13–16, and the inertial braking mechanism 13–16 in turn applies to the drive mechanism 7–12 an inertial braking force, attributable to the mass of the inertia wheel 14 for slowing the movement of the unblocking members 1, 2 from their blocking to their unblocking positions.

In particular, the surface 11 of the drive cam 10 bears upon the surface 16 of the driven cam of inertia wheel 14 and transmits to the driven cam the drive force by means of which the drive mechanism 7–12 drives the inertial braking mechanism 13–16. Torsion spring 15 is provided to ensure contact between the surfaces 11 and 16 of the drive and driven cams.

The configurations of the cam surfaces 11 and 16 are such that, as the driven mechanism drives the inertial braking mechanism, the surface 11 of the drive cam actually rolls along the surface 16 of the driven cam.

The location of contact between these two cam surfaces is denoted by A in FIGS. 1 and 2. When the drive mechanism 7–12 and the unblocking members 1 and 2 are in the unactivated position of FIG. 1, cam surface contact location A is near the pivot 9 of the drive lever 8.

When the drive lever 8 is released and progressively moves the members 1 and 2 towards their unblocking position, cam surface contact location A progressively moves towards the pivot 13 of the driven cam on inertia wheel 14, until finally it reaches the position shown in FIG. 2.

When the location A of cam surface contact is near drive cam pivot 9, the inertial braking force applied by braking mechanism 13-16 to drive mechanism 7-12 is quite low. However, as location A shifts towards driven cam pivot 13, during the rolling of cam surface 11 upon cam surface 16, the inertial braking force applied by braking mechanism 13-16 to drive mechanism 7-12 increases.

In particular, the configurations of the two cam surfaces 11 and 16 are such that, as the drive mechanism 7-12 drives the inertial braking mechanism 13-16, the rate at which the cam surface contact location A shifts from pivot 9 to pivot 13 itself increases progressively. In other words, the amount of shift of location A, per degree of rotation of drive cam 10 relative to pivot 9, increases as the drive mechanism 7-12 moves the unblocking members 1, 2 from their blocking to their unblocking positions. As a consequence, the amount of rotation imparted to the driven cam on inertia wheel 14, per degree of rotation of drive cam 10, increases progressively.

As a result of these relationships, the inertial braking force applied by braking mechansim 13-16 to drive mechanism 7-12, during the initial portion of the range of movement of the members 1 and 2 is relatively low. Consequently,, the drive mechanism 7-12 quickly overcomes the inertia of the unblocking members 1 and 2, and these are moved out of their initial positions with high acceleration, so as to quickly reach their designed unblocking speed. In particular, the members 1, 2 almost immediately move in the linear manner which is desired.

However, at the point at which the unblocking members have reached their designed angular velocity, the drive cam 10 begins to set the inertia wheel 14 into motion to a non-negligible degree. The cam surface contact location A begins to shift from pivot 9 towards pivot 10 at a greater rate, and the amount of rotation imparted to the driven cam of inertia wheel 14 by drive cam 10, per degree of rotation of drive cam 10, rises markedly. As a result, the inertial braking force applied by braking mechanism 13-16 to the drive mechanism 7-12 likewise rises markedly, so that the designed angular velocity of the members 1, 2, having now been reached, will be maintained.

The shutter mechanism of FIGS. 1 and 2 additionally includes an aperture-blocking member 20 controlled by an electromagnet 21. In per se conventional manner, after the members 1, 2 have been moved to their unblocking positions, electromagnet 21 can be triggered, for example by an automatic exposure timer, to release aperture-blocking member 20, to terminate an exposure operation.

Figure 3:
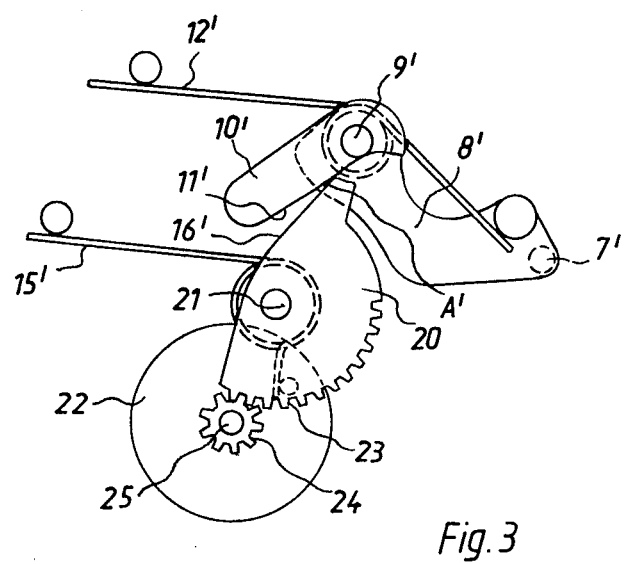
FIG. 3 depicts a portion of a second embodiment of the invention.

FIG. 3 depicts another embodiment of the inventive concepts. Components corresponding to those in FIGS. 1 and 2 are denoted by corresponding characters, with the addition of a prime. In FIG. 3, the drive cam 20 of the inertial braking mechanism is distinct from the heavy inertia wheel 22 of the braking mechanism. The driven cam 20 and the inertia wheel 22 are mounted for rotation on respective pivots 21 and 25. Driven cam 20 is provided with gear teeth 23, and inertia wheel 22 is provided with gear teeth 24 meshing with the gear teeth 23. As the surface 11' of drive cam 10' rolls along the surface 16 of driven cam 20, angularly displacing driven coam 20, rotation is imparted to the distinct inertia wheel 22. In general respects, however, the principle of operation of the embodiment of FIG. 3 is the same as described above.

In the embodiments described above, drive lever 8 is part of a drive mechanism 7-12 which drives both the aperture-unblocking members 1, 2 and the inertial braking mechanism 13-16. However, this is merely exemplary. Alternatively, the drive mechanism could be operative for driving only the inertial braking mechanism 13-16, and itself be driven by the members 1, 2, or equivalently by a separate drive mechanism for the members 1, 2.

It will be understood that each of the elements described above, or two or more together, may also find a useful application in other types of constructions differing from the types described above.

While the invention has been illustrated and described as embodied in a particular type of shutter mechanism, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a shutter mechanism, in combination, an aperture-unblocking member mounted for movement between an aperture-blocking position and an aperture-blocking position; a drive mechanism engaging said aperture-unblocking member; an inertial braking mechanism driven by said drive mechanism when said aperture-unblocking member moves from said blocking to said unblocking position and operative during such movement for applying to said drive mechanism an inertial braking force slowing the movement of said member to said unblocking position, said drive mechanism including a drive cam, said inertial braking mechanism including a driven cam, the surface of said drive cam bearing upon the surface of said driven cam and transmitting to said driven cam the drive force by means of which said drive mechanism drives said intertial braking mechanism, said cams being so configured that as said drive mechanism drives said inertial braking mechanism during said movement from aperture-blocking to aperture-unblocking position, the surface of said drive cam rolls along the surface of said driven cam with predetermined unique successive parts of the surface of the drive cam successively contacting respective predetermined unique successive parts of the surface of the driven cam.

2. In a shutter mechanism as defined in claim 1, said drive mechanism including means mounting said drive cam for rotation about a first predetermined axis, said inertial braking mechanism including means mounting said driven cam for rotation about a second predetermined axis.

3. In a shutter mechanism as defined in claim 2, the configuration of said cams being such that the location of contact of the surfaces of said cams progressively moves from a position near said first axis towards said second axis as said aperture-unblocking member moves from said blocking position towards said unblocking position.

4. In a shutter mechanism as defined in claim 3, the configuration of said cams being such that the amount of angular displacement of said driven cam imparted thereto by said drive cam per degree of rotation of said drive cam increases as said aperture-unblocking member moves from said blocking to said unblocking position at least within that part of the range of movement of said cams corresponding to the initial part of the range of movement of said member.

5. In a shutter mechanism as defined in claim 1, said drive mechanism including first biasing means for transmitting driving force to said drive cam, said inertial braking mechanism including second biasing means opposing the drive force transmitted by said drive cam to said driven cam.

6. In a shutter mechanism as defined in claim 1, said driven cam being provided with gear teeth and mounted for rotation, said inertial braking mechanism including an inertial braking member distinct from said driven cam, said inertial braking member being provided with gear teeth meshing with the gear teeth of said driven cam and being mounted for rotation by said driven cam.

7. In a shutter mechanism as defined in claim 1, further including an aperture-blocking member mounted for movement between an aperture-unblocking position and an aperture-blocking position and shutter-closing means operative when triggered for causing said aperture-blocking member to move from said unblocking to said blocking position.

8. In a shutter mechanism as defined in claim 1, said inertial braking mechanism and said aperture-unblocking member both being driven by said drive mechanism, said inertial braking mechanism being driven by said drive mechanism not through the intermediary of said aperture-unblocking member, said aperture-unblocking member being driven by said drive mechanism not through the intermediary of said inertial braking mechanism.

9. In a shutter mechanism as defined in claim 1, the surfaces of said cams being so configured and disposed that these surfaces are in contact with each other throughout the entire movement of the aperture-unblocking member from blocking to unblocking position, said drive mechanism applying drive force to said inertial braking mechanism throughout the entirety of such movement, said inertial braking mechanism applying inertial braking force to said drive mechanism throughout the entirety of such movement.

10. In a shutter mechanism as defined in claim 9, the configuration and disposition of the surfaces of said cams being such that the inertial braking force applied to said drive mechanism at the start of such movement is low so as not to interfere with acceleration of said aperture-unblocking member but is thereafter progressively greater and greater so as to prevent said aperture-unblocking member from moving too fast during the post-initial part of such movement.

* * * * *